A. A. BAECHI.
CUTTER GUARD.
APPLICATION FILED MAR. 8, 1917.

1,255,687.

Patented Feb. 5, 1918.

Albert A. Baechi
Inventor

By Geo. P. Kimmel
Attorney

UNITED STATES PATENT OFFICE.

ALBERT A. BAECHI, OF LA GRANDE, OREGON.

CUTTER-GUARD.

1,255,687.                Specification of Letters Patent.        Patented Feb. 5, 1918.

Application filed March 8, 1917. Serial No. 153,390.

*To all whom it may concern:*

Be it known that I, ALBERT A. BAECHI, a citizen of Switzerland and resident of La Grande, in the county of Union and State of Oregon, have invented certain new and useful Improvements in Cutter-Guards, of which the following is a specification.

This invention relates to new and useful improvements in cutter guards, and the primary object of the invention is to provide a guard for a rotary cutter, that will protect the operator's fingers during the use of the machine. This guard is primarily intended for use on meat cutting machines of the type employing a vertically disposed rotary cutter that is positioned in a bowl, but the same is adapted for use on various kinds of cutters that employ broad features set forth in this machine, and the use of the device is not necessarily limited to the type of machine upon which it is shown.

Another object of the invention is to provide a guard of this character which is adapted to be applied to the conventional type of meat cutting machine, with no change whatsoever to the construction of the machine.

A further object of the invention is to provide a device of this character, which is easily and simply constructed, inexpensive to manufacture, and one which will be very efficient in operation.

With these and numerous other objects in view, my invention consists of the novel features of construction, combination and arrangement of parts, which will be herein referred to and more particularly pointed out in the specification and claim.

Figure 1:
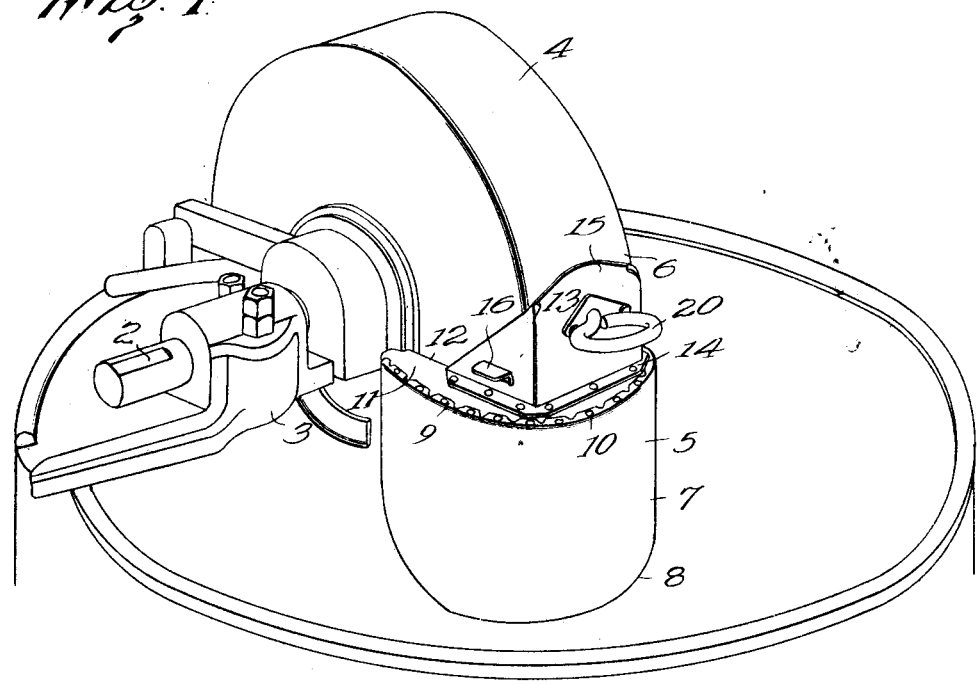
Figure 2:
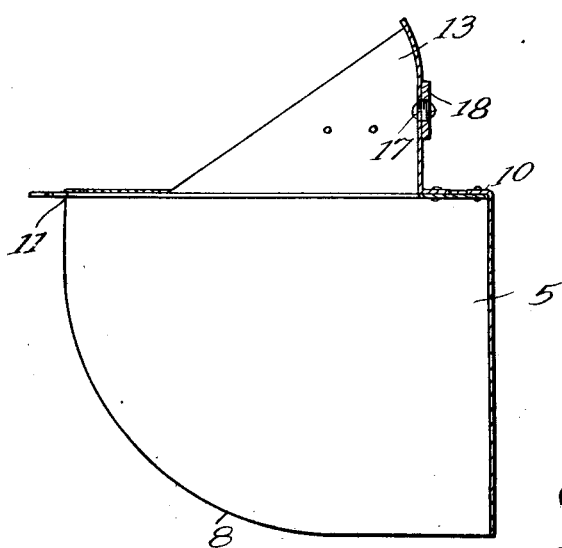

In the accompanying drawing:

Figure 1 is a perspective view of my guard applied to a meat chopping machine of the conventional type, and Fig. 2 is a vertical section through the guard.

In describing my invention I shall refer to the drawing in which similar reference characters designate corresponding parts throughout the several views. The numeral 1 designates the bowl of the meat chopping machine, which has positioned therein a rotary cutter, that is vertically disposed and which is mounted on a horizontally extending shaft 2, in bearings 3. The cutter is provided with a hood 4 over its upper portion, that is disposed above the top of the bowl 1 of the machine. This construction is of the conventional type of meat chopping machine, and I do not claim any of the parts thereof as part of my invention.

My invention resides in the guard 5, which is adapted to be secured to one end 6 of the hood 4 over the cutter, and which extends to the bottom of the bowl, thereby protecting the operator's fingers during the use of the machine. The guard 5 comprises a body portion 7, which is semi-circular in cross section, and which has its bottom edge curved, as shown at 8 to allow free circulation of the meat in the bowl 1 adjacent which it is positioned.

The upper edge of the body 7 is provided with a plurality of laterally bent clips 9 which are secured by rivets 10, to a top plate 11, that is positioned therein. The top plate 11 is provided with a notch 12 in its free edge, that is adapted to engage the end 6 of the hood 4 over the rotary cutter. Secured to the plate 11 adjacent the inner edges of the notch 12, is an upright extension 13, which has its bottom edge provided with a flange 14, that is riveted to the top plate, and which has its main wall 15 curved, to conform to the shape of the outer edge of the end of the hood 4. The side portions of said extension have ears 16 formed thereon, the purpose of which is obvious.

The wall 15 of the extension 13 is provided with an opening 17, and secured to the outer side of said wall is a diamond-shaped plate 18, that is provided with an internally threaded opening therethrough, which is adapted for alinement with the opening 17 of said wall. When the device is in position a fastening screw 20 is adapted to be positioned through said opening, and to engage an internally threaded alining opening in the outer wall of the hood 4, thereby securely fastening the guard in position.

From the above description of the construction of this type of guard, it is obvious that the same is easily and simply applied to the end of the hood 4, and will cover up the exposed portion of the rotary cutter, within the bowl 1 of the machine. The shape of the guard is such that it forms a protection around the said portion of the cutter, in the bottom of the machine, so that there will be no danger to the operator, and will safeguard his fingers during the use of the machine. This type of guard is adapted to be applied to the conventional type of machine now in use, and it is only necessary to provide the hood 4 with a threaded opening adjacent the end to which the guard is secured, whereupon the guard may be placed in position and the detachable fastening screw positioned through said part to securely hold the guard.

From the foregoing description of the construction and operation of my new and improved guard for rotary cutters, the manner of applying the same to use and the operation thereof will be readily understood, and it will be seen that I have provided a simple and efficient means for carrying out the objects of this invention.

Having thus fully described my invention, what I claim as new and desire to secure by Letters Patent, is:

In combination with a rotary cutting machine having a hood arranged over one portion of the same, a bracket having tapered wings bent at substantially right angles thereto, a guard element secured to the lower marginal portions of the bracket, the end wall of the bracket having a screw threaded opening therein, and an attaching screw passing through the opening into engagement with the adjacent portion of said hood.

In testimony whereof, I affix my signature hereto.

ALBERT A. BAECHI.

Copies of this patent may be obtained for five cents each, by addressing the "Commissioner of Patents, Washington, D. C."